United States Patent [19]
Carlton

[11] Patent Number: 4,966,267
[45] Date of Patent: Oct. 30, 1990

[54] BALL SCREW ACTUATED CLUTCH COMBINATION

[75] Inventor: Kenneth E. Carlton, Muncie, Ind.

[73] Assignee: Borg-Warner Automotive Diversified Transmission Products Corporation, Sterling Heights, Mich.

[21] Appl. No.: 410,561

[22] Filed: Sep. 21, 1989

[51] Int. Cl.[5] .......................... F16D 21/04; F16D 3/14
[52] U.S. Cl. ..................................... 192/48.91; 192/51; 192/94; 74/377
[58] Field of Search .................. 192/21, 48.91, 51, 54, 192/94; 74/377

[56] References Cited

U.S. PATENT DOCUMENTS

| | | | |
|---|---|---|---|
| 2,091,268 | 8/1937 | Colman | 192/94 X |
| 3,135,129 | 6/1964 | Merritt | 192/94 X |
| 3,158,244 | 11/1964 | Lanigan, Jr. et al. | 192/94 X |
| 3,419,118 | 12/1968 | Allaben, Jr. | 192/35 |
| 3,946,841 | 3/1976 | LaFollette et al. | 192/35 |
| 4,138,006 | 2/1979 | Benson, Jr. | 192/48.91 |
| 4,287,973 | 9/1981 | Eichinger et al. | 192/54 |

FOREIGN PATENT DOCUMENTS 2170870 2/1985 United Kingdom .................. 192/51

Primary Examiner—Richard Lorence
Attorney, Agent, or Firm—James A. Geppert; Greg Dziegielewski

[57] ABSTRACT

A double clutch arrangement for use in a transmission or other place where a mechanical clutch is desired that has a high torque capacity and small engagement and disengagement forces at the shift lever. The clutch arrangement is utilized on the output shaft of a two-position clutch having forward and reverse gears and includes a ball screw actuated clutch mechanism positioned between the shaft and an externally actuated encompassing shift collar in combination with a friction clutch mechanism. The friction clutch mechanism comprises either a pair of clutch friction packs positioned between the shift collar and the forward and reverse gears or a pair of cone clutches therebetween. Initial actuation of the forward or reverse friction pack or cone clutch will initiate the ball screw clutch mechanism to lock up the clutch in either direction.

13 Claims, 4 Drawing Sheets

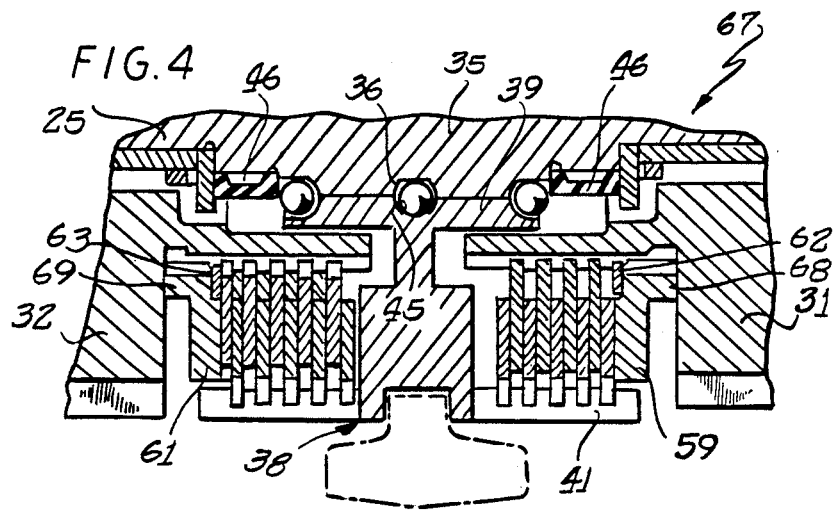
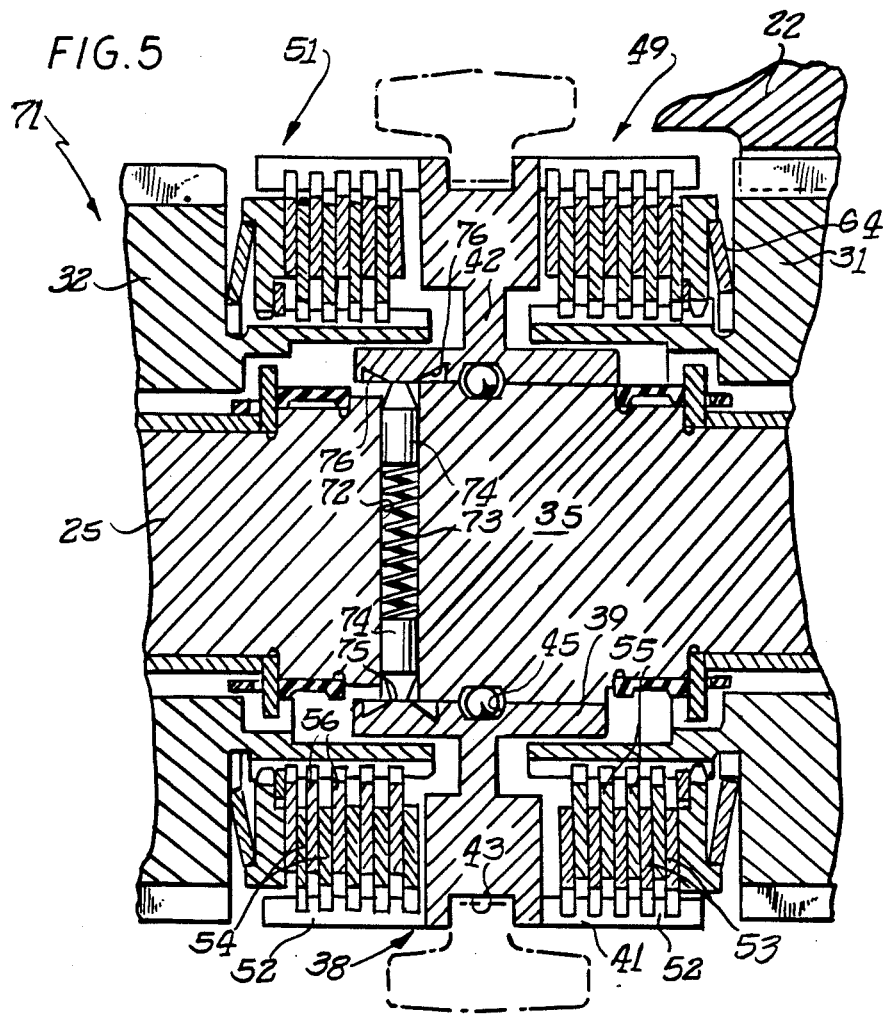

BALL SCREW ACTUATED CLUTCH COMBINATION

TECHNICAL FIELD

The invention disclosed herein relates to a transmission and more particularly to a novel clutch arrangement for a marine transmission or any other place where a hydraulic clutch is not desired, but where a mechanical clutch is desired that has a high torque capacity and small engagement and disengagement forces at the shift lever.

BACKGROUND

In marine drives, both dog clutches and friction clutches have been employed However, dog clutches provide an undesirable jerk when engaged, particularly when the engine is running at high speeds. On the other hand, friction clutches require considerable clamp force and are not well suited to remote control. Many mechanically actuated clutches, as compared to hydraulic or magnetically actuated clutches, utilize a single clutch element or combination of clutch elements, such as friction clutch packs, cone clutches and/or ball screw mechanisms.

The combination of a cone clutch with a friction clutch pack has been commonly used in marine transmissions where a pair of opposite friction packs are combined with a cone clutch for each mechanism, one clutch pack acting to actuate the forward drive and the other clutch pack actuating the reverse drive; conventionally the forward/reverse drive is manually actuated from the exterior of the transmission. In a construction where a numerically high mechanical advantage clutch loading mechanism is used, which is totally independent of the torque acting on and passing through the clutch, the clutch clamping mechanism usually has a very limited travel, and there are problems in accommodating the take-up of the clearances and the wear allowance for the clutch. This limited travel restriction is present because the ratio of the movement between the clutch operating member and the clutch clamping member is usually inversely proportional to the ratio of the mechanical advantage. Consequently, in-service adjustments or automatic wear compensators are required, which can add considerable expense to the clutch.

The U.S. Pat. No. 4,287,973 to Eichinger et al discloses a shiftable friction clutch for gear drives wherein a combination clutch utilizes interleaved compressible fiction rings or overlapping conical rings and a selectively operable structure effecting engagement of either clutch device. The selectively operable device includes a roller and ramp structure between the driving and driven parts responding to torque initially applied to the driving member for generating an axial force which is then applied to the clutch pack compressing structure.

The British Patent Application GB No. 2170870A discloses an embodiment of power shift clutch which includes a clutch loading device in a boat gearbox, the device having a ball screw mechanism in combination with multiple friction plate power drive clutches at the respective ends of the transmission structure. However, the ball screw helix angle is self-releasing for the clutch, and the shift mechanism requires locking pins and springs. The pins and springs are the origin of the force required for a cone clutch which is also inserted in the clutch as part of the actuating mechanism. The detent force caused by the pins and springs subtract from the force which passes through the clutch pack and reduces the efficiency of the design. Also, for marine applications, excess torque could occur if the propellor driven by the transmission were to strike an underwater object. This excess is controlled by slippage which occurs initially at the cone clutch and then at the clutch pack. Further, the torque capacity of this mechanism is limited depending on the point where the cone clutch begins to slip.

The present invention provides a ball screw actuated clutch mechanism which is used in combination with a pair of oppositely disposed clutching mechanisms for the forward and reverse directions.

DISCLOSURE OF THE INVENTION

This invention pertains to a clutching arrangement for a marine transmission or any other place where a mechanical clutch is desired that has a high torque capacity and small engagement and disengagement forces for the shift lever. The clutching arrangement involves a combination of opposed clutches and a ball screw mechanism which cooperate to provide improved clutch engagement and disengagement. By careful selection of the screw angle for the ball screw clutch, the clutch combination will lock up when actuated, yet requires a minimum amount of force to disengage the clutch. This arrangement provides a smoother operation for the transmission and ease of shifting with minimum effort.

BRIEF DESCRIPTION OF DRAWINGS

FIG. 4 is a cross sectional view similar to FIG. 3 showing a second embodiment of the clutch mechanism.

FIG. 5 is a cross sectional view taken on line 5—5 of FIG. 1, but showing a third embodiment of the clutch mechanism.

MODES FOR CARRYING OUT THE INVENTION

Figure 1:
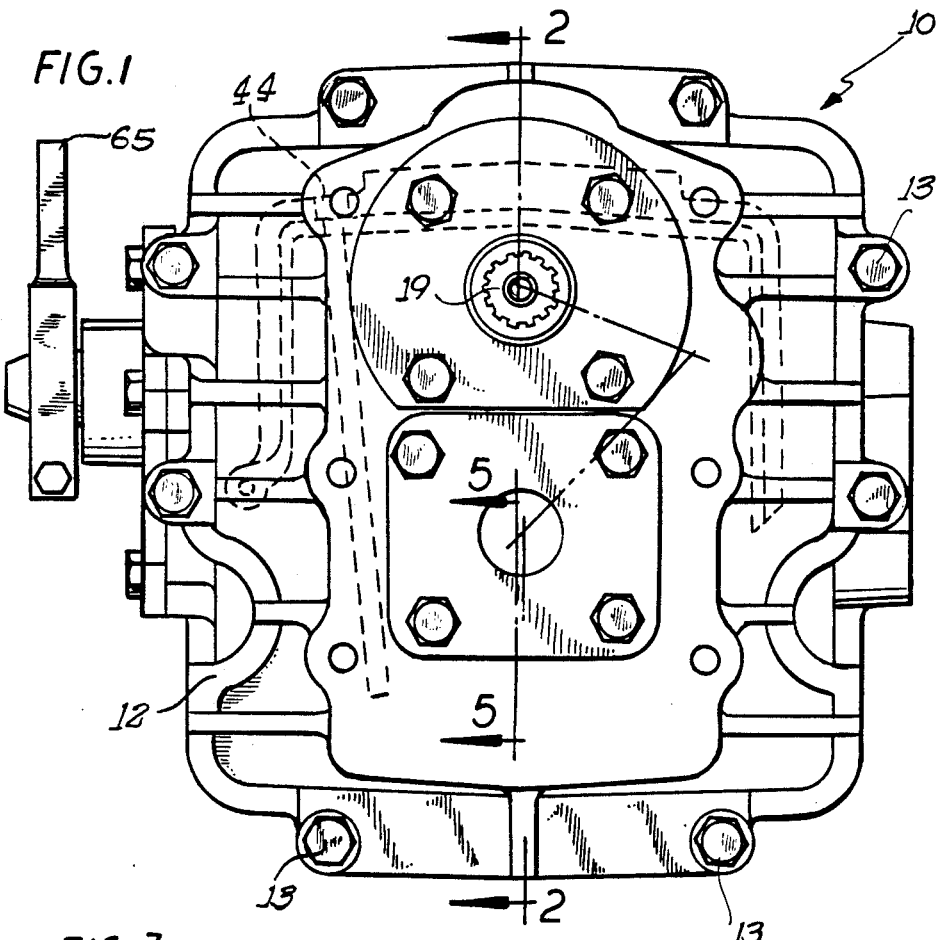
FIG. 1 is an end elevational view of a marine transmission embodying the combination clutch arrangement of the present invention.
Figure 2:
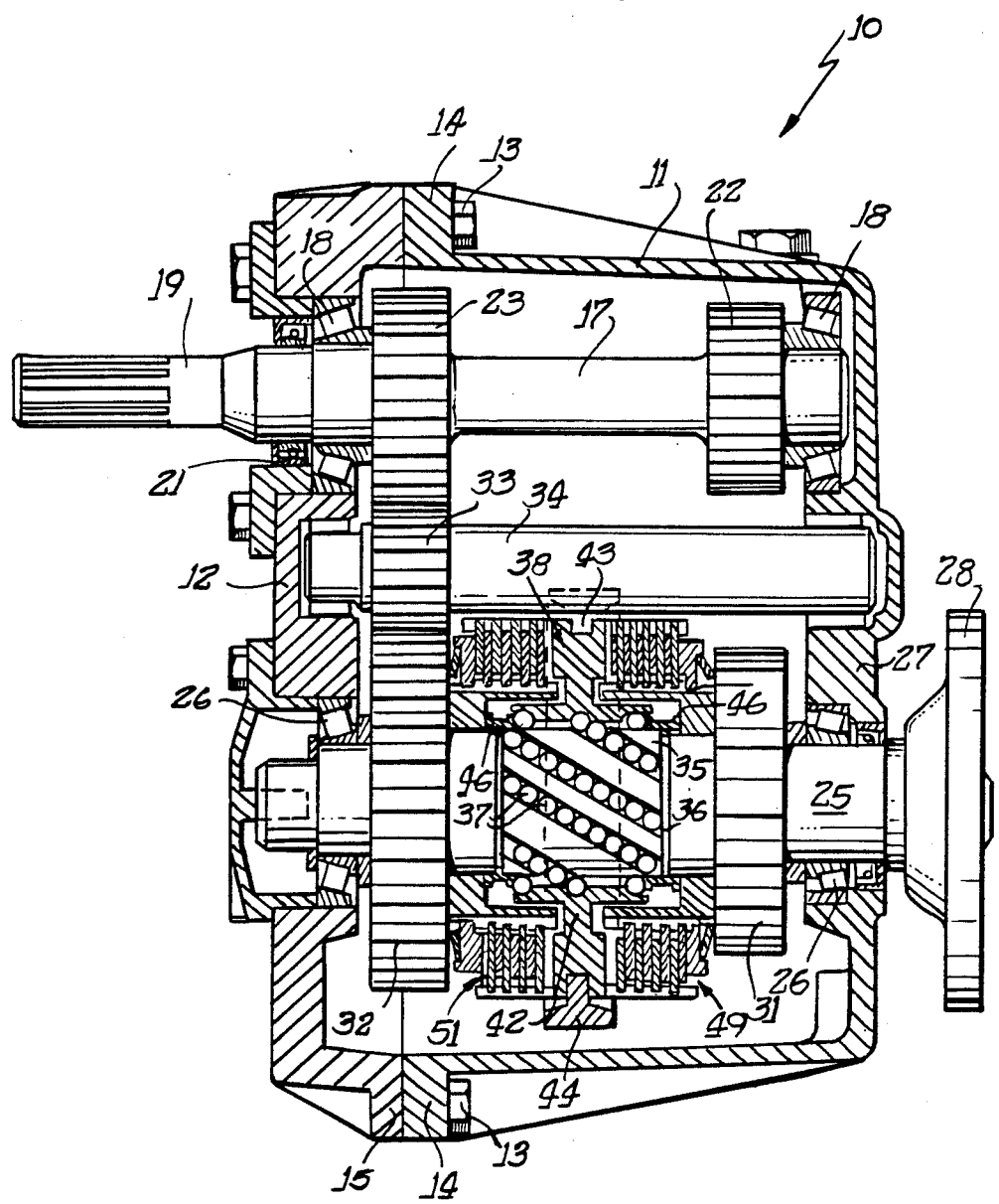
FIG. 2 is a cross sectional view taken on the irregular line 2—2 of FIG. 1 showing one embodiment of the clutch mechanism in the transmission with the gears revolved into the plane of the paper for clarity.

Referring more particularly to the disclosure in the drawings wherein are shown illustrative embodiments of the present invention, FIGS. 1 and 2 disclose a transmission 10, such as a marine transmission, including a housing 11 open at one end which is closed by a end plate 12 secured to the housing by bolts 13 passing through flanges 14, 15; a supplemental mounting plate may be secured to the end plate 12 to provide a mounting surface or flange (not shown) for suitable attachment to a boat or other vehicle. Mounted for rotation in the housing and end plate is an input shaft 17 received in spaced bearings 18, 18 adjacent both the end plate and the closed end 27 of the housing, with the end 19 of shaft 17 projecting through the plate 12 for connection to a suitable driving means, such as a marine engine (not shown). Also, a suitable seal 21 encompasses the shaft 17 in the end plate to prevent leakage of lubricant from the housing. The shaft 17 is provided with a forward gear 22 and an axially spaced reverse gear 23 mounted thereon to rotate therewith.

An output shaft 25 is also rotatably mounted in the housing in bearings 26, 26 and projects through the closed end 27 of the housing to terminate in a flange 28 for connection with the propellor or other final drive assembly (not shown). Mounted for rotation on the output shaft 25 through needle bearings 29 (FIG. 3) are a forward gear 31 and an axially spaced reverse gear 32, the forward gear 31 meshing with the forward gear 22 of the input shaft 17 (see FIG. 5) while the reverse gear 32 meshes with an idler gear 33 on an intermediate shaft 34 (FIG. 2) rotatably mounted in the housing behind and between the shafts !7 and 25, the gear 33 also meshing with reverse gear 23. Both the forward gears 22 and 31 and the reverse gears 23 and 32 rotate continuously during operation of the transmission.

Formed on an enlarged portion 35 of the shaft 25 are a plurality of partial ball grooves 36 adapted to receive a plurality of balls 37 acting between the shaft 25 and a one-piece shift collar 38. The shift collar includes an inner cylindrical sleeve portion 39 and an outer cylindrical sleeve portion 41 joined by a radial flange or wall 42; the outer sleeve portion having an external annular groove 43 to receive a shift fork 44 actuated by a lever 65 external of the housing. The inner sleeve portion 39 is provided with a plurality of partial ball grooves 45 complementary to and facing the ball grooves 36 on the enlarged portion 35 of the shaft 25 to receive the balls 37 therebetween. Annular rings 46 on the shaft at either end of the enlarged shaft portion act to retain the balls in the complementary sets of ball grooves.

The radial wall 42 is formed with an enlarged portion which provides pistons 47 and 48 for opposed friction plate clutches 49 and 51 respectively. The outer sleeve portion 41 is formed with a plurality of axially extending internal splines or slots 52 for driving engagement with the toothed peripheries of a plurality of first friction plates 53 and 54 interleaved with a plurality of second friction plates 55 and 56 splined to axial extensions 57 and 58 of the forward and reverse gears 31 and 32, respectively. Opposite the pistons 47 and 48 are end plates 59 and 61 which may be splined onto the extensions 57 and 58, respectively. Snap rings 62 and 63 are received in grooves in the gear extensions and a disk spring 64 is located between each end plate and respective gear on the shaft 25 for a purpose to be described later.

By selecting the proper clutch geometry, the ball screw mechanism can be made to lock up when the friction plates are engaged and yet, with a relatively small force, the ball screw mechanism can be disengaged. This requires careful selection of the screw angle for the ball screw mechanism. With reference to FIG. 2, a clutch is engaged by force coming from the shift fork 44 produced by a shift lever 65 external to the transmission. The shift fork urges the collar 38 in one direction; for example, toward the forward gear 31, with the piston 47 of the shift collar 38 urging the friction plates 53 and 55 toward the end plate 59 to initiate clamping action. A resulting small torque is achieved in the clutch 49 which is transmitted from the gear 31 through the clutch 49 to the collar 38 and through the ball screw mechanism 35 by the inner sleeve 39, balls 37 and enlarged portion 35 of the output shaft 25, which in turn causes a still larger clamping force to be generated through the clutch 49, collar 38 and ball screw mechanism. The result is that the clutch 49 locks itself up along with the ball screw mechanism to deliver torque from the input shaft 17 to the output shaft 25. This clutch combination can deliver an unlimited amount of torque with the only limitation being the strengths of the materials involved. The snap ring 62 or 63 engages the disk spring 64 and sets the initial compression of the disk spring when the clutch is disengaged; each disk spring 64 acting to limit the torque by deflecting when excessive force passes through the clutch pack.

The screw angle relative to the centerline of the shaft for the ball screw clutch is set according to the following equation:

$$\frac{f(D + d)n}{2PD} \tan(\text{screw}) > 1$$

where:
f = Coefficient of friction of clutch
D = Outside facing diameter of clutch
d = Inside facing diameter of clutch
PD = Pitch diameter of screw thread
Screw = Screw helix angle
n = Number of active clutch faces.

For example; if f=11, D=3.35, d=2.7, r=0.825 and n=13, then the screw angle should be 69 degrees or less.

To disengage the clutch, force is applied to the shift collar 38 in the opposite direction which causes the friction plates 53, 55 to separate. When the force on the shift collar reaches a sufficiently high value, the plates begin to slip and the torque through the ball screw clutch mechanism decreases causing the ball screw force to decrease. As the ball screw force decreases, additional slippage occurs resulting in still smaller ball screw forces. The end result is that the shift collar 38 is able to be brought into a position so that the clutch is not locked up. Engagement of the clutch 51 for the reverse gears 23 and 32 is identical except that the shift collar 38 moves in the opposite direction toward the reverse gear 32 on the shaft 25.

Figure 3:
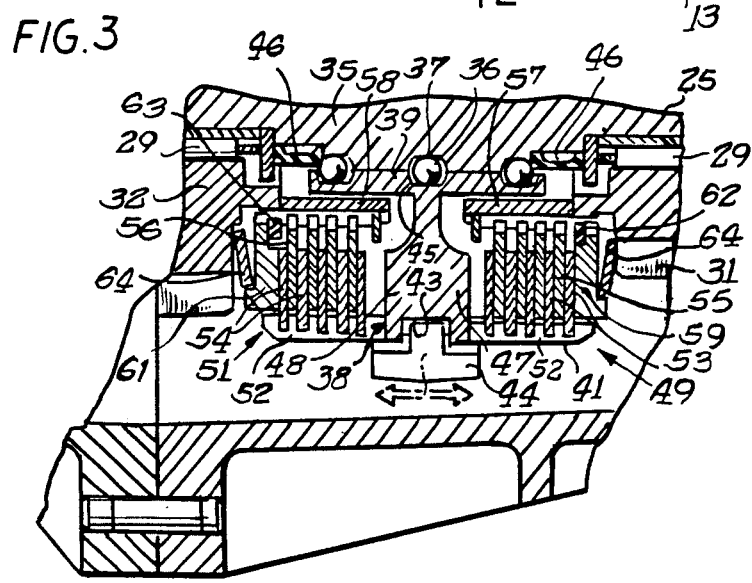
FIG. 3 is an enlarged view of a portion of FIG. 2 more clearly showing the clutch mechanism.

FIG. 4 discloses a second embodiment 67 of the clutch device substantially similar to that shown in FIGS. 1 through 3, except that the disk springs 64 have been omitted and the end plates 59 and 61 are providing with collars 68 and 69 abutting the gears 31 and 32, respectively. This clutch operates in the same manner to that shown in FIGS. 2 and 3 except that there is no limiting device for excessive torque passing through the clutch packs.

FIG. 5 is a third embodiment 71 of the clutch device which is similar to that of FIGS. 2 and 3, except for the pins that are inserted into the output shaft 25. As seen, a single diametrically extending passage 72 is bored in the enlarged portion 35 of the shaft adjacent the end of the ball screw device to house a centrally located spring 73, the spring urging a pair of oppositely disposed pins 74, 74 against an annular land 75 formed in the internal surface of the inner sleeve portion 39 of shift collar 38. The land 75 separates a pair of outwardly inclined ramps 76, 76 so that cooperation between the pins and either ramp tends to move the collar 38 into either the forward or reverse position with less effort because the pins will easily move off the land 75 onto one of the ramps 76. Thus, the second option, as shown in FIG. 5, would be to set the clutch geometry with a similar equation as follows:

$$\frac{(D+d)n}{2PD} \tan(\text{screw}) < 1$$

Figure 6:
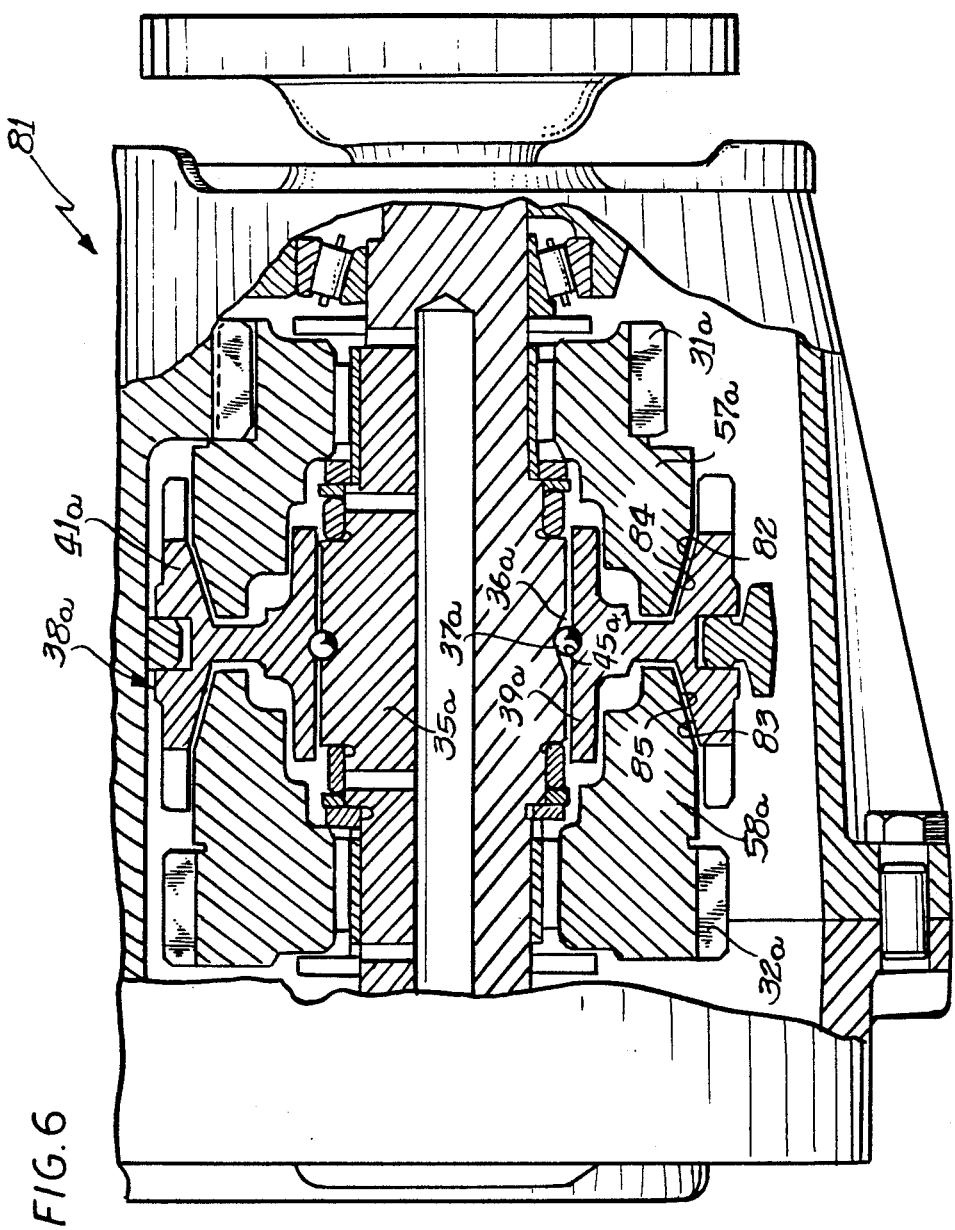
FIG. 6 is a cross sectional view similar to FIG. 3 showing a further embodiment of the clutch mechanism.

This arrangement would cause the shift collar to require a relatively small force applied to it in order that the clutch will engage. The value of the screw angle from this equation is below the critical angle set forth for the first two embodiments FIG. 6 discloses a further embodiment of clutch combination 81 where a pair of cone clutches are substituted for the opposed clutch packs. In this embodiment, the outer sleeve portion 41a of the shift collar 38a is provided with a pair of opposed cone surfaces 82, 83 which are facing a complementary pair of cone clutch surfaces 84, 85 formed on the inner extensions 57a, 58a of the forward and reverse gears 31a and 32a. Here again, the ball screw actuated mechanism includes the partial ball grooves 36a on the enlarged portion 35a of the shaft 25a and complementary partial ball grooves 45a in the inner sleeve portion 39a of the shift collar 38a receiving the balls 37a.

This clutch embodiment operates in the same manner as the previous embodiments, except that movement of the shift collar in either direction will cause either cone surface 82 or 83 to be moved into engagement with the facing cone surface 84 or 85, respectively, which will in turn actuate the ball screw mechanism to lock up the clutch and actuate either the forward or reverse gears for the transmission.

INDUSTRIAL APPLICABILITY

The described ball screw actuated clutch structure with friction disk packs or cone clutches would be useful in transmissions or any place where a mechanical clutch is desired that has a high torque capacity and small engagement and disengagement forces. As shown, the clutch arrangement is particularly useful in a marine transmission where only forward and reverse gears are required.

I claim:

1. A clutch arrangement for use in a transmission having forward and reverse gears, wherein the transmission includes an input shaft, an output shaft, axially spaced first forward and reverse gears mounted for rotation with the input shaft, axially spaced second forward and reverse gears mounted for rotation on the output shaft, said forward gears on the two shafts being in meshing engagement, an idler shaft carrying an idler gear in meshing engagement with the reverse gears on the two shafts, and a clutching device encompassing the output shaft for actuation of the output shaft in either the forward or reverse direction, the improvement comprising a shift collar encompassing the output shaft, a ball screw mechanism between the shift collar and the output shaft, and a pair of opposed clutch devices forming a first clutch between the shift collar and the second forward gear and a second clutch between the shift collar and the second reverse gear, said shift collar being a unitary member having an inner cylindrical sleeve portion and an outer cylindrical sleeve portion joined by a radial flange, said inner sleeve portion encompassing the output shaft and the outer sleeve portion receiving an externally actuated shift fork.

2. A double clutch arrangement as claimed in claim 1, wherein said clutch devices comprise a pair of opposed clutch packs, each clutch pack being located between the shift collar and either the second forward or reverse gear.

3. A double clutch arrangement as claimed in claim 2, wherein said radial flange forms a pair of opposed pressure pistons, each of said pistons acting to engage either the forward or reverse clutch pack.

4. A double clutch arrangement as claimed in claim 2, wherein said clutch packs each consist of interleaved clutch plates with alternate plates having peripheries cooperating with the outer sleeve portion of the shift collar to rotate therewith.

5. A double clutch arrangement as claimed in claim 2, wherein the second forward gear and the second reverse gear each has an axial extension which is externally splined to receive the other alternate friction plates in each clutch pack, and an end plate splined on each gear extension on the opposite side of the friction pack from the piston.

6. A double clutch arrangement as claimed in claim 1, wherein the output shaft has a central enlarged portion with a plurality of partial external ball grooves formed therein, the inner sleeve portion of the shift collar has a plurality of complementary partial internal ball grooves facing the first mentioned ball grooves, and a plurality of balls received in the facing complementary grooves forming the ball screw mechanism.

7. A double clutch arrangement as claimed in claim 5, wherein a diaphragm spring is located between each end plate and the second forward gear and second reverse gear to limit torque passing through the clutch packs.

8. A double clutch arrangement as claimed in claim 7, wherein a stop ring is mounted on the axial extension of each gear abutting the end plate and setting the initial force of each disk spring.

9. A double clutch arrangement as claimed in claim 7, wherein each end plate engages the second forward gear or second reverse gear.

10. A double clutch arrangement as claimed in claim 7, wherein the output shaft has a diametrically extending bore therein receiving a centrally located spring and a pair of oppositely disposed pins, a pair of spaced ramps formed in the internal surface of the inner sleeve portion defining a land therebetween, said pins being urged into contact with the land or either ramp.

11. A double clutch arrangement as claimed in claim 1, wherein each said clutch device comprises a cone clutch between the shift collar and each gear.

12. A double clutch arrangement as claimed in claim 11, wherein each cone clutch includes a cone surface on each side of the outer sleeve portion of the shift collar and a complementary cone surface on the axial extension of the forward and reverse gears.

13. A double clutch arrangement as claimed in claim 12, wherein said ball screw mechanism includes a plurality of partial external ball grooves formed on a central enlarged portion of said output shaft, the inner sleeve portion of the shift collar has a plurality of complementary partial internal ball grooves facing the first mentioned ball grooves, and a plurality of balls received in the facing complementary grooves.

* * * * *